Aug. 5, 1924.
F. W. BRACKETT
1,504,020
ROTARY FILTER OR STRAINER
Filed Sept. 6, 1923     2 Sheets-Sheet 1
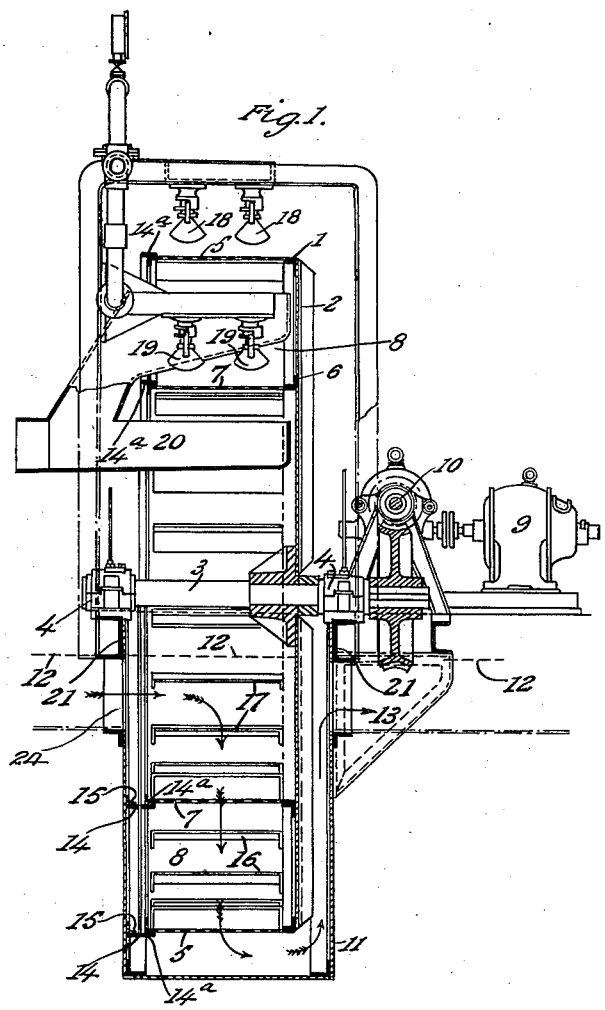
Inventor
Francis Whitwell Brackett,
by
Attorney

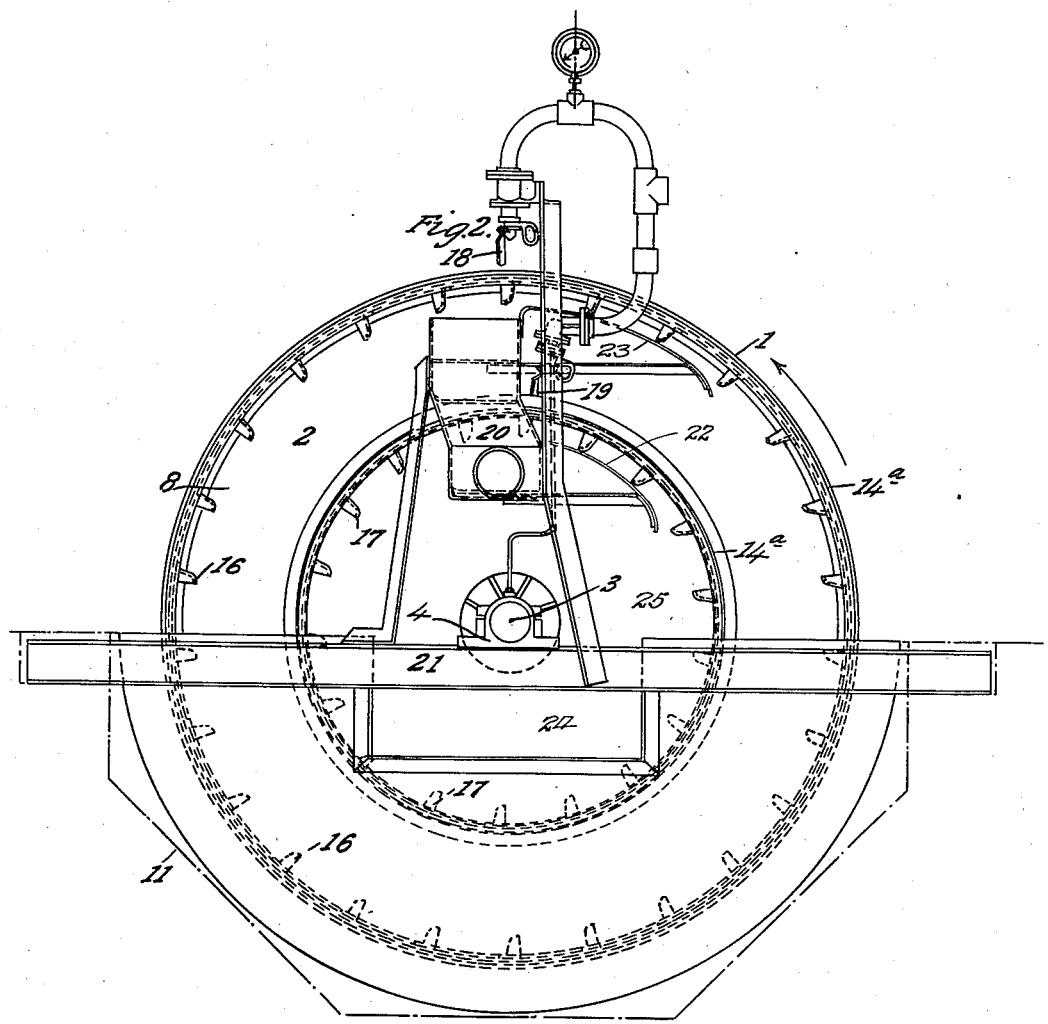

Patented Aug. 5, 1924.

1,504,020

UNITED STATES PATENT OFFICE.

FRANCIS WHITWELL BRACKETT, OF COLCHESTER, ENGLAND.

ROTARY FILTER OR STRAINER.

Application filed September 6, 1923. Serial No. 661,261.

*To all whom it may concern:*

Be it known that I, FRANCIS WHITWELL BRACKETT, a subject of the King of Great Britain, residing in Colchester, England, have invented certain new and useful Improvements Relating to Rotary Filters or Strainers, of which the following is a specification.

This invention relates to rotary apparatus used for effecting the filtering or straining of liquids in two or more stages, the apparatus being of the kind wherein the liquid is caused while passing from an inlet to an outlet to flow in turn through a series of concentric rotating drum screens. It consists in an improved construction and arrangement of parts as hereinafter described and claimed.

The improved apparatus is particularly suited for dealing with wash water used for quenching coke in coke oven installations and separating from the water the small pieces of coke and coke-dust which is contained in considerable quantities in such water, thereby rendering it clean, and recovering the coke which would otherwise be wasted. To this end each drum screen may be provided, as the sieve portions in some known types of rotary drum filters have been, with means whereby solids retained by the screens are raised by means of scoops attached to the inside of the drum screens and adapted to deliver the solids when raised into discharging troughs, the screens being cleansed by means of jets of water projected against them.

The accompanying drawings show a rotary coke screening apparatus constructed and arranged according to the invention and in its simplest form comprising two screens, Fig. 1 being a vertical section thereof, and Fig. 2 an end elevation.

The illustrated apparatus consists of a hollow open-ended horizontal cylinder 1 closed at one end by a plate 2, the cylinder being mounted on a shaft 3 carried in suitable bearings 4 supported in any suitable manner, as for instance by girders 21.

The periphery of the cylinder may be formed of fine wire gauze or the like 5 which constitutes one of the screens. Concentrically disposed inside this cylinder is a small open-ended hollow cylinder 6 whose periphery, constituting the other or coarser screen, or the first stage, may be of perforated plate 7. The two cylinders or screens form between them an annular-shaped drum 8. Any suitable means may be provided for rotating the drum, and such means may, for instance, comprise, as shown, an electric motor 9 and multi-worm reduction gears 10.

The drum is arranged with its lower portion dipping into a tank 11, which is here shown made of metal, but may, if preferred, be made of brick, concrete or the like. The level of the water or liquid in the tank (indicated approximately by the line 12) is above the inlet 24 in one of the side walls of the tank 11, through which inlet the uncleaned water or liquid to be cleaned is admitted to the tank 11 and then to the inner cylinder through the open end 25 of the latter.

In carrying out a water-filtering or straining operation, the uncleaned water or liquid is delivered to the tank 11 at one side of the latter through the supply duct 24 and then to the interior of the inner cylinder 6. Owing to the head of water, the water flows, as indicated by the arrows in Fig. 1, first through the perforated plate 7 constituting the periphery of the inner cylinder, then through the wire gauze 5 constituting the periphery of the outer cylinder 1, and then into the tank or sump 11 from whence it passes out through an outlet or over-flow 13 provided for the purpose at the opposite side of the tank 11. Uncleaned water may be prevented from passing round the outside of the drum and be compelled to pass only through the straining screens or cylinder rims by means of sealing strips, arranged between the walls of the tank and the drums. These sealing strips may, conveniently, consist of flat pieces of rubber 14 curved to lie on suitable curved supports 15 of substantially the same radius as the peripheral faces of the screens, the strips 14 being arranged to be in close vicinity to those faces or to similar strips 14$^a$ carried by the screens.

Owing to the flow of the water through the strainer or drum the larger pieces of coke are caught upon the inner surface of the inner or coarser screen 7, the finer pieces passing through this screen being caught by the outer or finer screen 5.

Paddles or scoops 16 and 17 may be fitted around the inner surfaces of the two respective screens for the purpose as explained above for lifting pieces of coke caught by the screens, the scoops being arranged radially or nearly so, their outer ends being open and adjacent to the surfaces of the screens, so that water lifted by the scoops can drain away through the screens.

On the strainer being slowly rotated, the fouled portions of the perforated plate 7 of the inner cylinder 6 and of the wire gauze 5 of the outer cylinder 1 are drawn out of the water with the smaller coke adhering to them. The larger pieces of coke which are too big to cling to the gauze 5 and plate 7 are elevated, respectively, by means of the paddles 16 and 17, until they reach the point immediately below two superposed series of cleaning jets 18 and 19, through which high pressure water is sprayed on to and through the external portion of the outer and inner cylinders, depositing the coarse coke and the finer coke into a trough or troughs 20 provided for their reception, the clean peripheral surfaces being returned by the rotation of the strainer to the water once more, so that the operation is continuous. The large pieces of coke which were elevated by the paddles fall by gravity into the trough 20, assisted by the high pressure water which is passed through the screens.

In order to prevent pieces of coke falling out of the scoops 16 and 17 on to the inner screen before the scoops arrive in succession above the troughs 20, spring trap plates 22, 23, may be attached to the troughs and arranged to bear against the lips of the scoops and thereby prevent the pieces of coke falling on to the screen as the scoops move into the vicinity of the troughs, as shown in Fig. 2.

The screened materials can be removed from the trough or troughs by any appropriate means.

Having thus described the nature of the said invention and the best means I know of carrying the same into practical effect, I claim:—

1. In a rotary liquid filter or strainer of the class described, a tank having on one side an inlet opening whereby unstrained liquid enters the tank and in a second side an outlet for the liquid after straining, a horizontal rotatably-mounted power shaft spanning the tank, a series of horizontally disposed cylindrical screens forming drums having open ends adjacent to the inlet side of the tank and closed ends adjacent to the outlet side of the tank, said screens being secured to the said shaft and disposed in concentric relation one within another and each with a portion dipping into the tank, each screen being composed of foraminous material, the size of the openings in successive screens being respectively diminished in a manner to render the screens successively finer from the innermost to the outermost screen of the series, and means, consisting of annular sealing strips interposed between the walls of the tank and the outer peripheral surfaces of the screens, to prevent unstrained liquid which enters the tank through its inlet from passing from the inlet side of the tank to the outlet side thereof between the side walls and the circumferential marginal edges of the screens, the liquid entering the innermost cylindrical screen being caused to pass in succession through the concentric cylindrical screens to the outlet side of the tank, substantially as described.

2. In a rotary liquid filter or strainer according to claim 1, means carried by each screen for elevating solid matter, said means consisting of radially arranged scoops secured to the inner surfaces of the screens, the ends of the scoops adjacent the said surfaces being open.

3. In a rotary liquid filter or strainer according to claim 1, a plurality of scoops carried by the inner surface of each of said screens and extending toward the axis thereof for elevating coarse material, means comprising a plurality of sets of water spray nozzles for cleaning the inner surfaces of the concentric screens, a set of said nozzles being arranged externally of and in proximity to the outer surface of each of said screens, and means, consisting of a plurality of troughs, for the reception of the spray water and solid material delivered by said scoops, one of said troughs being arranged internally of each screen and in opposing relation to each of said nozzles, substantially as described.

In testimony whereof I have signed my name to this specification.

FRANCIS WHITWELL BRACKETT.